April 23, 1940. G. F. M. PEDERSEN Re. 21,433

CAPSULE STOPPER FOR BOTTLES, JARS, GLASSES, AND THE LIKE

Original Filed Sept. 29, 1937

Inventor:
GUNNER FREDERIK MARINUS PEDERSEN
By Haseltine Lake & Co.
Attorneys

Reissued Apr. 23, 1940 Re. 21,433

UNITED STATES PATENT OFFICE 21,433

CAPSULE STOPPER FOR BOTTLES, JARS, GLASSES, AND THE LIKE

Gunner Frederik Marinus Pedersen, Copenhagen, Denmark, assignor to Dansk Crown-Cork Fabrik ved Aage Weybye-Lassen, Copenhagen, Denmark Original No. 2,133,565, dated October 18, 1938, Serial No. 166,310, September 29, 1937. Application for reissue September 9, 1939, Serial No. 294,153. In Denmark October 7, 1936

6 Claims. (Cl. 215—39)

The ordinarily known bottle closures often called crown corks or crimped caps, for bottles and the like have fitted in the bottom of the cap a sealing disc of cork, pasteboard or the like and, on the outside of the latter, most frequently a disc of some substance or other that is not affected by the liquid contained in the bottle. This latter disc is smaller than the former one, which is referred to in the following as the cork disc and it has therefore to be centered relatively to the cork disk and is then suitably cemented thereto. Here the difficulty arises that on the one hand it is difficult to secure for the inner disc or blank an absolute centering and, on the other hand, it is a fact that the bottle will leak, if the blank is not properly centered.

It is also known to provide the cork disc with a circular slit, and to bend the edges of the same back, so that the slit will gape, after which the bent-down flange of a blank is pressed into the slit, and the disc is then flattened and can now be inserted into the cap itself.

This process requires quite a number of different operations and is therefore expensive and complicated.

The present invention has for its object to remove this drawback, in that the blank is given an absolutely accurate centering, and does not need to be cemented to the cork disc. The invention consists therefore in that the blank, without the edges being bent, is pressed into a permanent depression in the cork disc by means of a self-centering piston with a projecting circular edge.

By the downward motion of the piston, the cork disc will receive a permanent deformation, and thereby the outer edge of the depression will become somewhat sloping, i. e. similar to a truncated cone, and will thereby maintain the blank in position, while the central part of the cork disc will become convex. When a metal cap with such a combined cork disc and blank is attached, in known manner, to a bottle or some other receptacle the blank will rest accurately over the mouth of the bottle neck, and by the pressure the cork disc will be pressed somewhat inwardly over the edge of the blank, and will prevent any liquid from penetrating behind the same.

It should further be noted that in all known caps fitted with foil, spot, "Cellophane" (registered trade-mark) or the like, the blank rests on the cork disc itself in such a manner that the plane of the blank is outside the surface of the annular ring of the cork disc. The consequence is that when the cap is applied to a bottle, the blank will gradually penetrate down into the cork, and thereby the tightening power of the cap will be reduced, while on the contrary by the present invention, the blank is pressed into the cork before the cap is applied, so that the blank and the cork are in the same plane, and the cap will therefore preserve its full tightening power.

Figure 1:
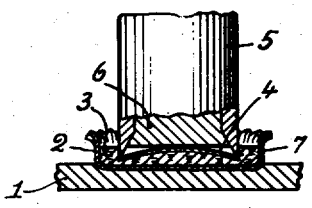
Figure 2:
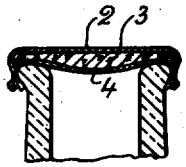
Figure 3:
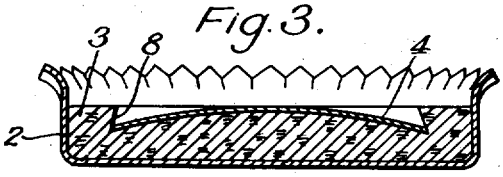

In the accompanying drawing:

Figure 1 is a vertical cross-sectional view of a support or chuck and cap with a piston or plunger for inserting the blank in the cork disc in the cap, Figure 2 is a fragmentary sectional view of a bottle and cap with the latter in position thereon, and Figure 3 is an enlarged cross-sectional view of the cap.

The reference character 1 designates a self-centering chuck keeping the cap in position, 2 the cap, 3 the cork disc and 4 the blank which by means of the cutting edge 7 of the tubular piston 5 is pressed down into the cork disc 3, and gives the same a permanent depression shaped like a truncated cone, after which the inner piston 6 presses the blank down into the depression shaped like a truncated cone in such a manner that the edge of the blank will be held therein. As shown more clearly in Figure 3, the wall 8 of the truncated cone overlies the marginal edge of the blank 4 and said inclined wall 8 acts to retain the blank 4 in the depression in the disc 3, this construction eliminating the bending of the edge of the blank 4 to form a flange for interlocking engagement with the cork disc.

Having now described my invention what I claim as new and desire to secure by Letters Patent is:

1. In a closure for bottles, a crimped cap, a sealing disc in the cap, said disc having a substantially flat peripheral surface, and also having a permanent depression therein bordered by inwardly inclined side walls in simulation of a truncated cone, said side walls being so positioned that they are adapted to be flexed inwardly by engagement by the neck of a bottle with which said cap may be used, and a bottle neck engaging disc in the depression with the edges of the side walls of the depression at the exposed side of the sealing disc overlying the marginal edge of the bottle neck-engaging disc and with said inclined walls retaining the disc in assembled relation and whereby the inclined side walls of the depression are adapted to overlie the marginal edge of the bottle neck-engaging disc when the cap is secured to a bottle.

2. In a closure for bottles, a crimped cap, a sealing disc in the cap, a depression in the disc having inclined side walls in simulation of a truncated cone and a bottle neck engaging disc in the depression with the edges of the side walls of the depression at the exposed side of the sealing disc overlying the marginal edge of the bottle neck engaging disc and with said inclined walls retaining the disc in assembled relation, the bottom wall of the depression being of convex formation and the bottle neck-engaging disc being of a concavo-convex formation for intimate contact with said bottom wall and the marginal edges of the same being spaced from the exposed face of the sealing disc.

3. A method of forming a closure for bottles comprising centrally positioning a flat circular blank on a flat circular sealing disc disposed in a cap, pressably cutting into said circular sealing disc at the edges of said circular blank and simultaneously forcing said blank into the sealing disc to permanently deform said sealing disc and produce a permanent circular depression therein and dispose the edge of said blank in said permanent depression, and thereafter pressing said blank in the said depression in such a manner that the edge of the blank will be held therein.

4. In a closure for bottles and the like, a crimped cap, a sealing disc in the cap having an exposed surface, a permanent depression in the sealing disc formed by depressing the material thereof to permanently deform the same at least at the periphery of the depression, the periphery of the depression having an inwardly inclined side wall, and a bottle neck engaging disc having its edges pressed into the depression whereby the edges of the side walls of the depression in the sealing disc overlie the marginal edge of the bottle neck-engaging disc annd retain the disc in assembled relation.

5. In a closure for bottles and the like a crimped cap, a sealing disc in the cap having an exposed surface, a permanent circular depression in the sealing disc with a bottom wall of a generally convex formation formed by depressing the material thereof to permanently deform the same at least at the periphery of the depression, the periphery of the depression having an inwardly inclined side wall, and a bottle neck engaging disc having its edges pressed into the depression, the bottle neck engaging disc conforming generally to the shape of the depression whereby the edges of the side walls of the depression in the sealing disc overlie the marginal edge of the bottle neck-engaging disc and retain the disc in assembled relation.

6. A sealing disc to be used with a cap to form a closure for bottles and the like having a depression therein formed by permanently deforming the material thereof and providing inwardly inclined side walls in simulation of a truncated cone, and a bottle neck engaging disc in the depression with the edges of the side walls of the depression at the exposed side of the sealing disc overlying the marginal edge of the bottle neck engaging disc and with the inclined walls retaining the disc in assembled relation, said depression being of such size and proportion that the exposed surface of the bottle neck engaging disc and the sealing disc are in substantially the same plane.

GUNNER FREDERIK
MARINUS PEDERSEN.